United States Patent [19]
Nguyen

[11] Patent Number: 6,076,098
[45] Date of Patent: *Jun. 13, 2000

[54] ADDER FOR GENERATING SUM AND SUM PLUS ONE IN PARALLEL

[75] Inventor: Ted Nguyen, Saratoga, Calif.

[73] Assignee: Samsung Electronics Co., Ltd., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,921

[22] Filed: Oct. 18, 1996

[51] Int. Cl.$^7$ ..................................................... G06F 7/50
[52] U.S. Cl. ........................... 708/706; 708/710; 708/714
[58] Field of Search .............................. 364/749, 787.01, 364/787.02, 787.03, 787.04, 788; 708/550, 551, 496, 497, 499, 516, 700, 706, 707, 710, 711, 712, 713, 714

[56] References Cited

U.S. PATENT DOCUMENTS

| | | | |
|---|---|---|---|
| 3,700,875 | 10/1972 | Saenger et al. | 235/175 |
| 4,464,729 | 8/1984 | Mlynek | 364/787 |
| 5,278,783 | 1/1994 | Edmondson | 364/787 |
| 5,283,755 | 2/1994 | Bechade | 364/757 |
| 5,615,140 | 3/1997 | Ishikawa | 364/749 |
| 5,631,860 | 5/1997 | Morinaka | 364/787.01 |

OTHER PUBLICATIONS

Arpad Barna and Dan I Porat, "Arithmetic Circuits," Integrated Circuits in Digital Electronics, A Wiley–Interscience Publication, John Wiley & Sons, pp. 236–248. 1973.

*Primary Examiner*—Chuong Dinh Ngo
*Attorney, Agent, or Firm*—Skjerven, Morrill, MacPherson, Franklin & Friel LLP

[57] ABSTRACT

A circuit is disclosed herein which generates the sum of two numbers (A and B) and the sum plus 1 in parallel so as not to take any additional time to generate the sum plus 1 value. The circuit comprises a carry look-ahead (CLA) tree portion and a summer portion. The CLA tree portion generates carry bits, as well as the logical relationship $A_i \overline{\text{XOR}} B_i$, for application to a summer for bit position i. The carry bits contain information for either inverting or not inverting the $A_i \overline{\text{XOR}} B_i$ bit for both the sum and the sum plus 1 output of the summer. The sum bit and sum plus 1 bit are generated at approximately the same time.

5 Claims, 21 Drawing Sheets

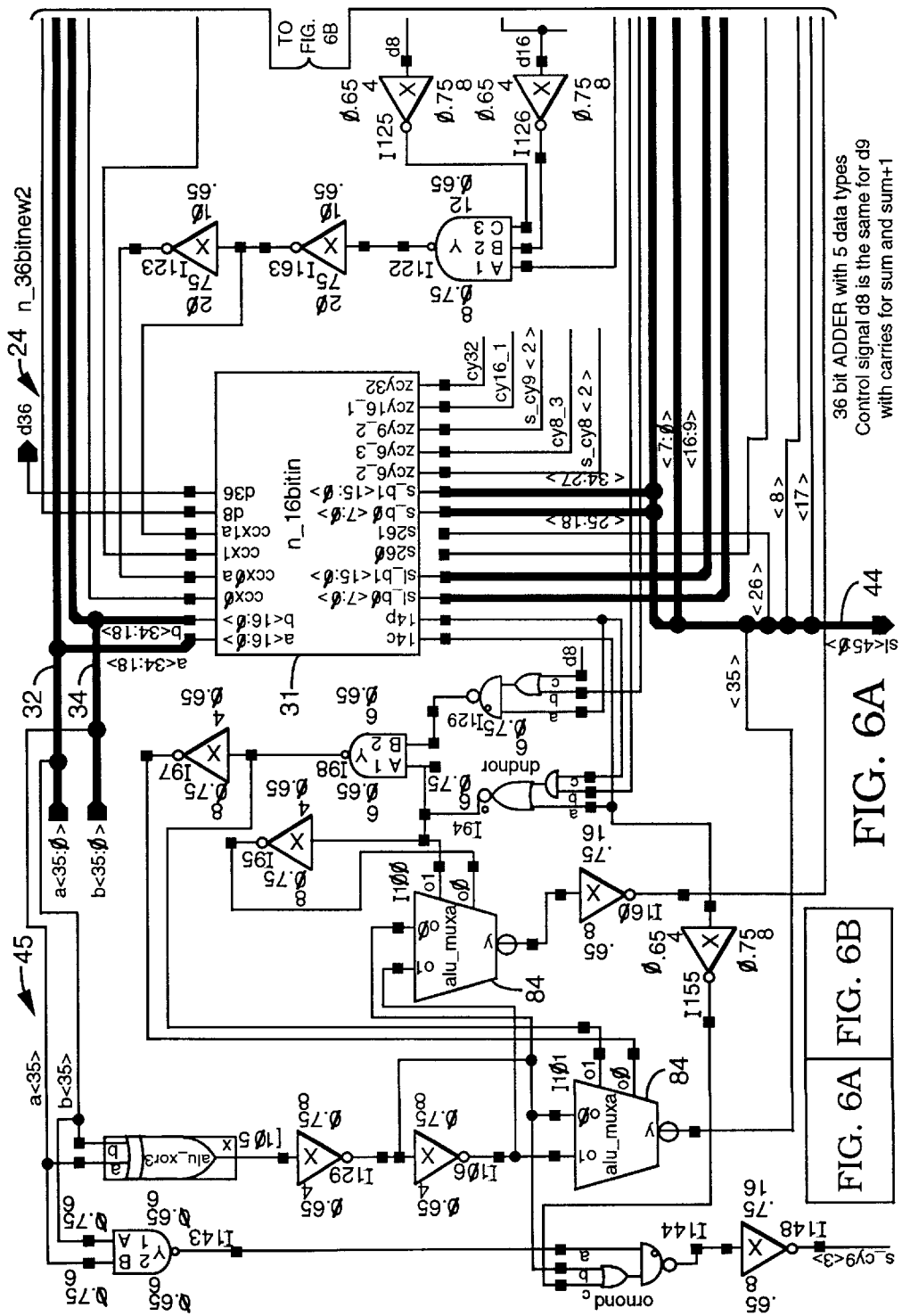

ADDER FOR GENERATING SUM AND SUM PLUS ONE IN PARALLEL

FIELD OF THE INVENTION

This invention relates to a carry look-ahead (CLA) adder and, more particularly, to a CLA adder which calculates a sum and a sum plus 1 in parallel.

BACKGROUND OF THE INVENTION

FIG. 1 illustrates a conventional carry look-ahead (CLA) adder 10 for adding two binary numbers A and B on buses 12 and 14. The CLA adder 10 consists of a carry tree portion 16 and a summer portion 18. The CLA portion 16 generates carry bits for the various bit positions in parallel and supplies them to a summer for each bit position. This summer for each bit position then generates a sum bit $S_i$ for the two binary numbers $A_i$ and $B_i$, for the bit position i, in accordance with the below equation, where $C_{i-1}$ is the carry bit from the next lower significant bit position.

$$S_i=(A_i XOR B_i) XOR\ C_{i-1} \quad \text{Eq. 1}$$

A CLA adder is very fast because carries of lower significant bit positions and carries of more significant bit positions are generated in parallel.

The output from the summer portion 18 is the sum of the numbers A and B plus a carry bit. This sum is then output on bus 20.

In certain applications, the sum of A plus B must be incremented by one for rounding off or for other uses in a floating point arithmetic operation well known to those skilled in the art. The generation of the sum plus 1 value is conventionally obtained by transferring the resulting sum on bus 20 to bus 12 and placing the number 1 on bus 14. These two numbers are then added using adder 10 to generate the sum plus 1 value. Accordingly, the generation of the sum plus 1 takes approximately twice as long as generating the sum itself.

What is needed is a faster technique to generate a sum and the sum plus 1.

SUMMARY

A circuit is disclosed herein which generates the sum of two numbers (A and B) and the sum plus 1 in parallel so as not to take any additional time to generate the sum plus 1 value. The circuit comprises a carry look-ahead (CLA) tree portion and a summer portion. The CLA tree portion generates carry bits, as well as the logical relationship $A_i \overline{XOR}\ B_i$, for application to a summer for bit position i. The carry bits contain information for either inverting or not inverting the $A_i \overline{XOR}\ B_i$ bit for both the sum and the sum plus 1 output of the summer. The sum bit and sum plus 1 bit are generated at approximately the same time.

In the preferred embodiment, the CLA tree portion is built of repeating modules so as to be easily increased in size or reduced in size, depending upon the bit width of the numbers to be added. In one embodiment, the adder is divided into two 16-bit sections, where carry bits for the sum and sum plus 1 from the first section are applied to each of the summers in the second section to possibly affect the outputs of the summers in the second section.

BRIEF DESCRIPTION OF THE DRAWINGS

FIG. 7 a diagram of a 2-bit logic block used in the 36-bit adder.

FIG. 8 is a diagram of a 4-bit logic block used in the 36-bit adder.

FIG. 9 is a diagram of an 8-bit logic block used in the 36-bit adder.

FIG. 12 is a diagram of a logic block for certain bit positions in a 16-bit logic block for converting signals into a format for use by the summers of FIGS. 4 and 5.

FIG. 13 is a diagram of a logic block for certain bit positions in a 16-bit logic block for converting signals into a format for use by the summers of FIGS. 4 and 5.

FIG. 14 is a diagram of a multiplexer used in a 16-bit logic black for the 36-bit adder.

FIG. 15 is a diagram of another multiplexer used in a 16-bit logic block for the 36-bit adder.

DETAILED DESCRIPTION OF THE PREFERRED EMBODIMENT

Figure 2:
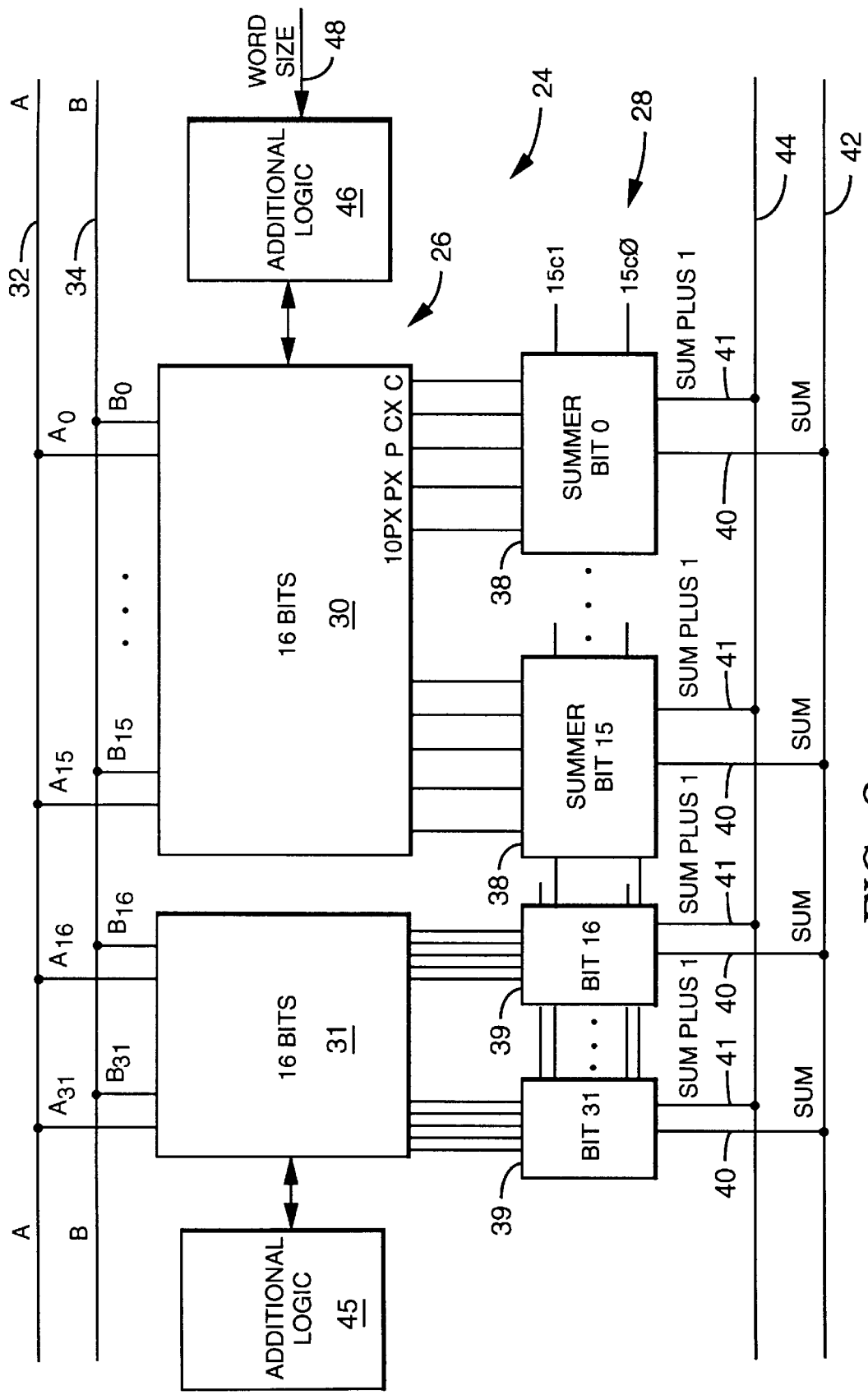
FIG. 2 is a block diagram of the preferred adder which generates a sum and a sum plus 1 of two numbers in parallel.

The preferred embodiment carry look-ahead (CLA) adder 24 is illustrated in FIG. 2 and consists of a CLA tree portion 26 and a summer portion 28. The CLA tree portion 26 is built of repeating modules (such as the two 16-bit modules 30 and 31), as illustrated in greater detail in FIGS. 3 and 6A through 15.

Figure 4:
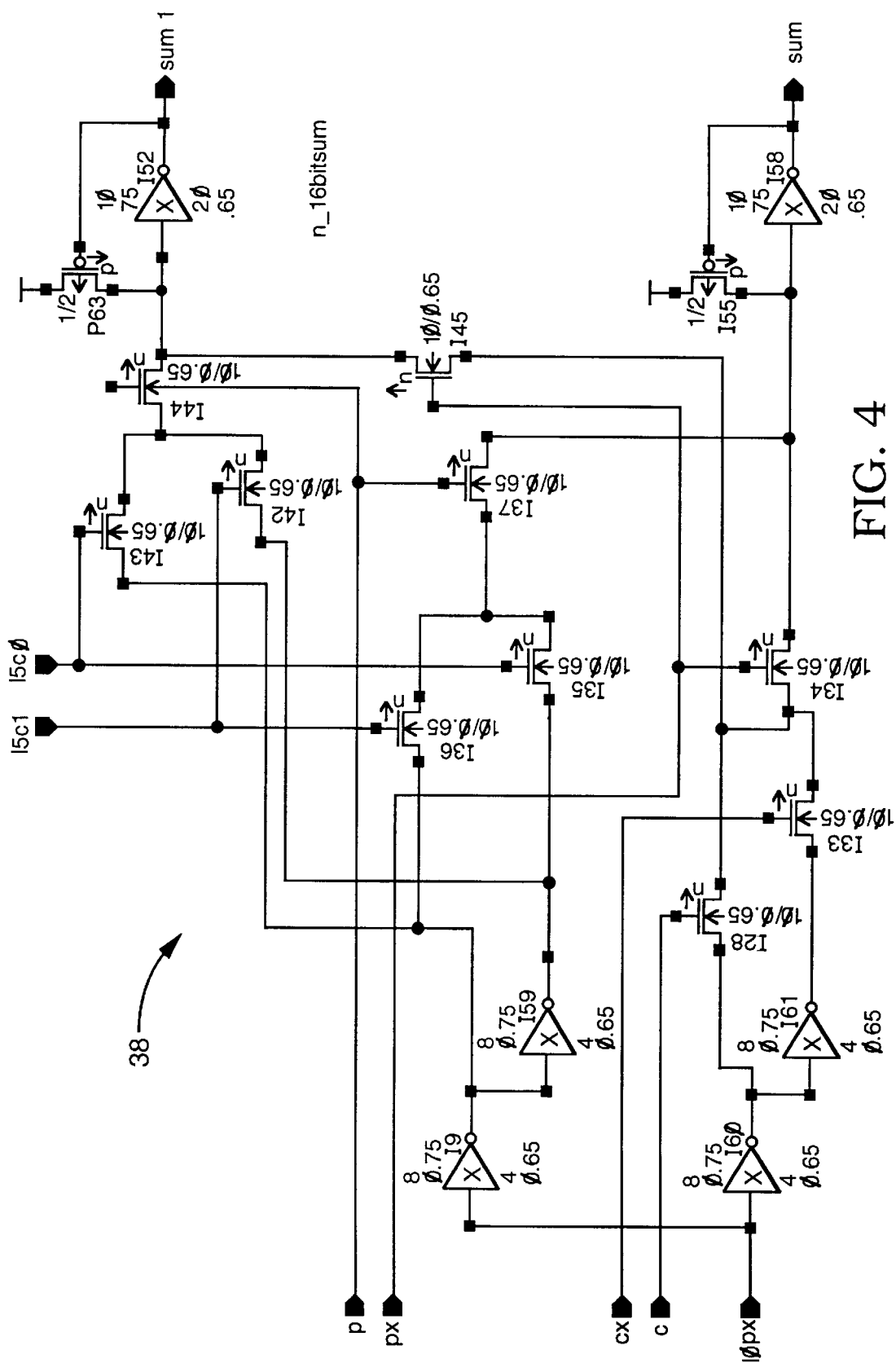
FIG. 4 is a transistor level diagram of a summer for each bit position in the first stage of the preferred adder.
Figure 5A:
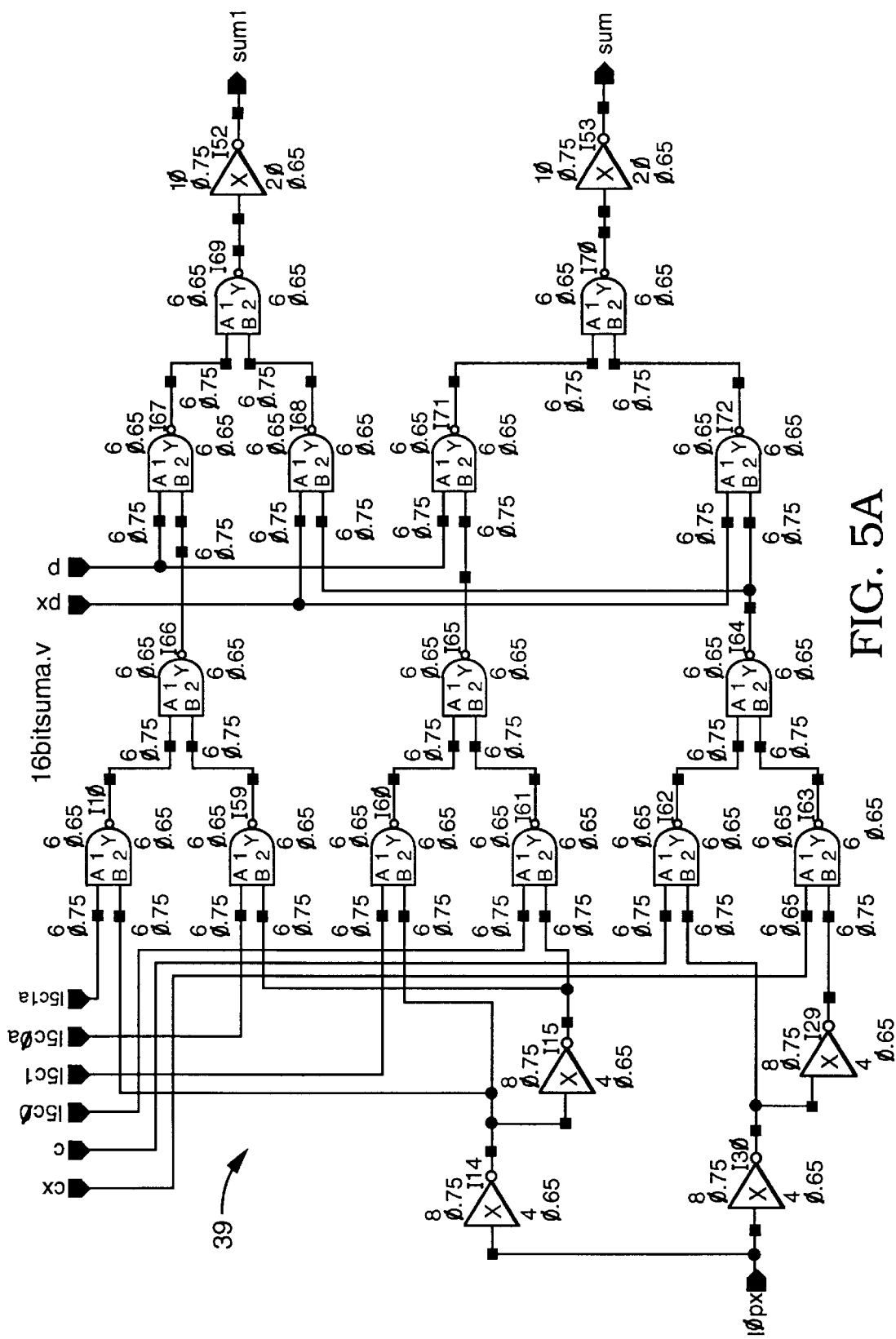
FIG. 5A is a logic diagram of a summer for each bit position in the second stage of the preferred adder.
Figure 5B:
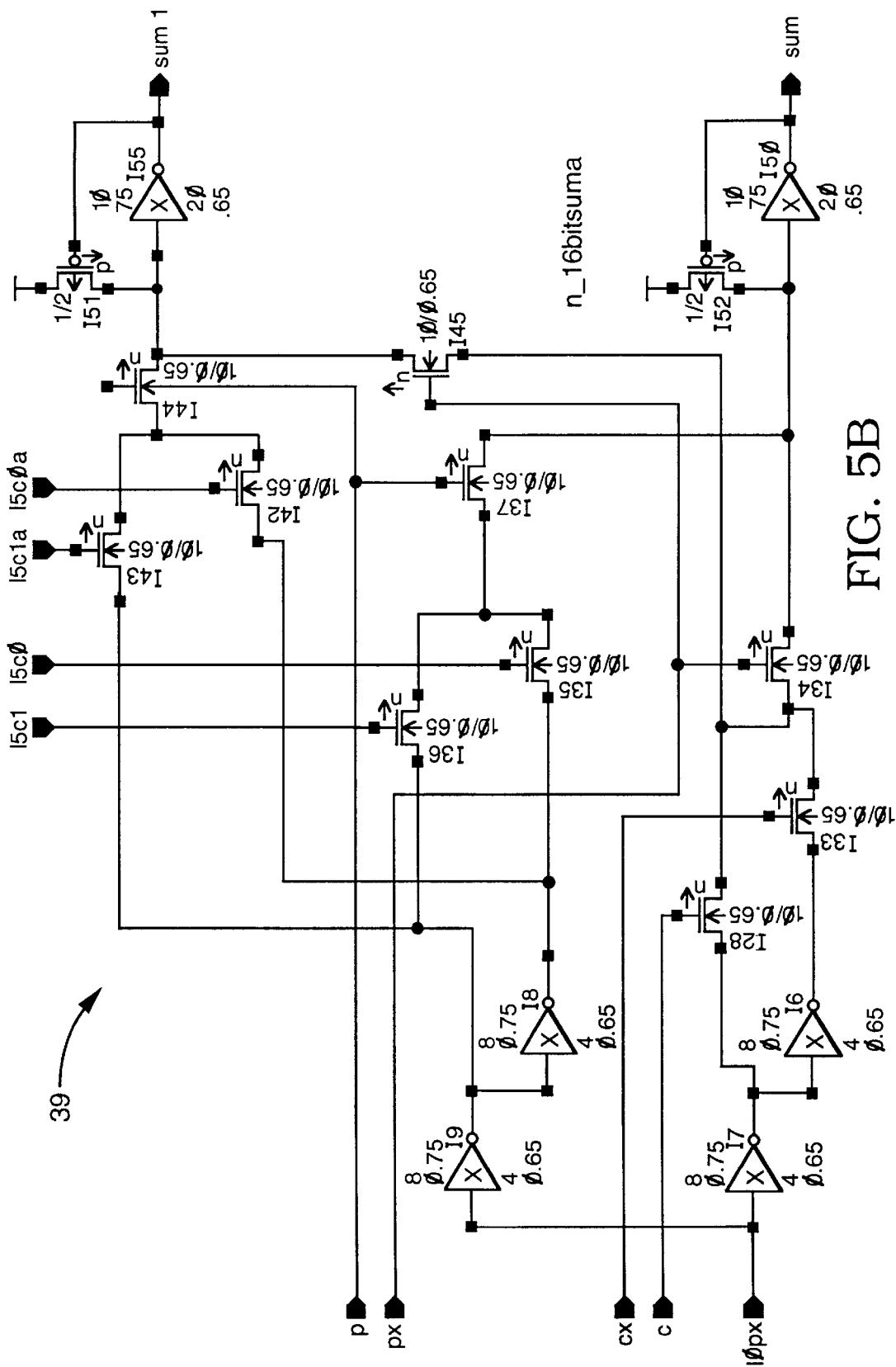
FIG. 5B is a transistor level diagram of the summer of FIG. 5A.

The CLA tree portion 26 receives as inputs binary numbers A and B on buses 32 and 34, respectively. The CLA tree portion 26 logically combines the bits on buses 32 and 34 to generate five bits per bit position, which are then applied to a summer 38 or 39 for that bit position. Detail of summer 38 is shown in FIG. 4, and detail of summer 39 is shown in FIGS. 5A and 5B.

The bits output by the CLA tree portion 26 to each summer 38, 39 in summer portion 28 are identified in FIG. 2 with the same nomenclature used in the schematic diagrams (FIGS. 4–15) for the actual device to more easily understand the relationship between the schematic diagrams of FIGS. 4–15 and FIG. 2. The five bits output from the CLA tree portion 26 for each bit position, to be discussed in more detail below, are c, cx (i.e., $\overline{c}$), p, px (i.e., $\overline{p}$), and 10px.

Figure 6B:
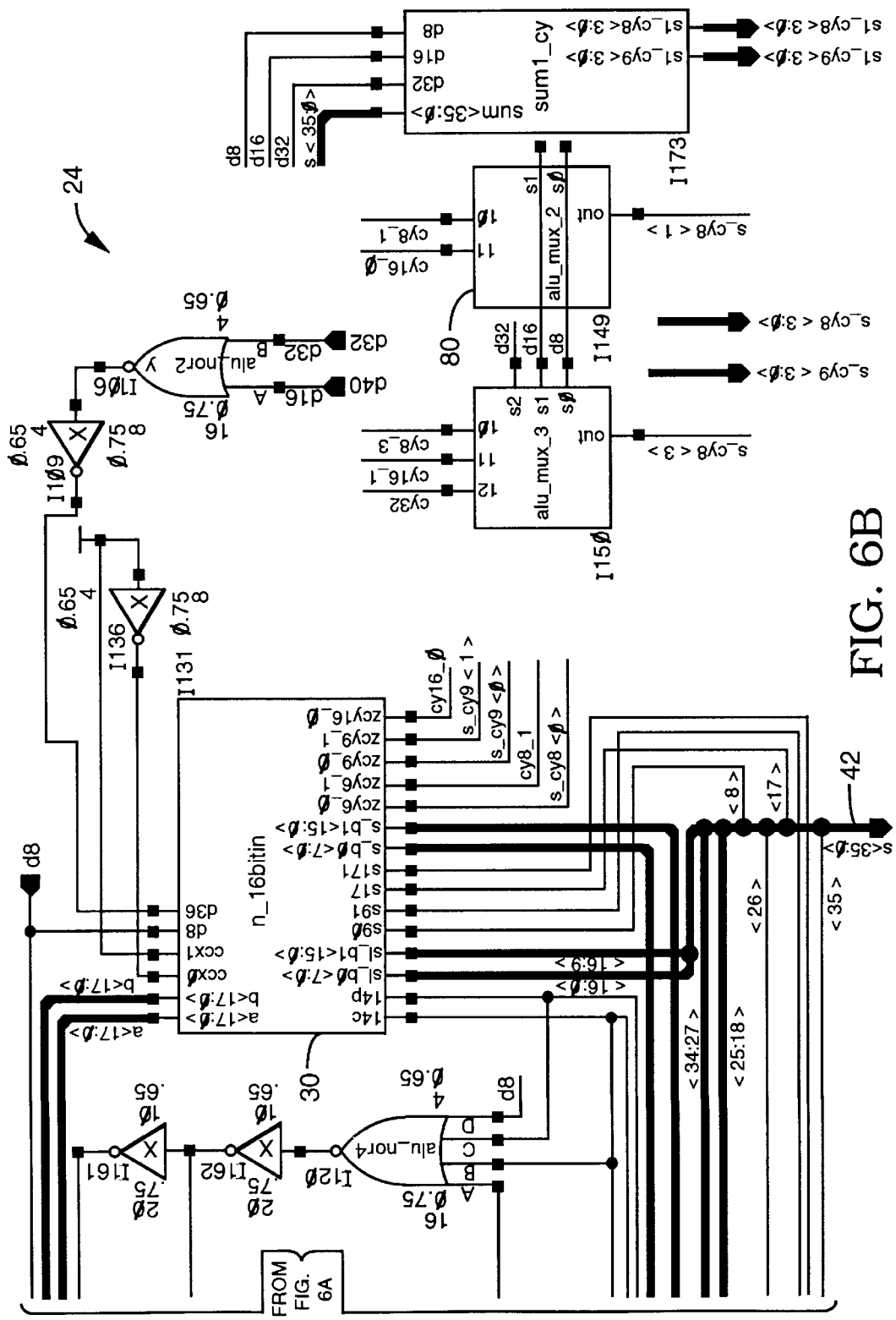
FIGS. 6A through 15 are schematic diagrams of an actual embodiment of the preferred embodiment circuit. More particularly, FIGS. 6A and 6B constitute a diagram of an actual 36-bit adder using the inventive techniques described herein.

In the actual embodiment, each summer 38 for the first 16-bit stage also has input terminals for receiving bits 15c1 and 15c0 (i.e., $\overline{15c1}$), identifying whether there is a carry bit from a previous arithmetic operation. Each summer 39 for the second 16-bit stage has input terminals for bits 15c1 and 15c0, identifying a carry bit from the sum generated by the previous 16-bit stage, and input terminals for bits 15c1a and 15c0a (i.e., $\overline{15c1a}$), identifying a carry bit from the "sum plus 1" generated by the previous 16-bit stage. The 15c1 and 15c0 terminals for the first 16-bit stage 30 are shown in the high level block diagram of FIG. 6B as terminals ccx1 and ccx0, respectively, which are tied to a logical 1 and 0, respectively. The 15c1, 15c0, 15c1a, and 15c0a terminals for the second 16-bit stage 31 are shown in FIG. 6A as terminals ccx1, ccx0, ccx1a, and ccx0a, respectively, connected to logic circuitry and to the first 16-bit stage 30. This is to enable the adder 24 to be modularized, with only a minimum of connections to a previous stage. This modular design simplifies the construction of the adder 24. In the preferred embodiment, each summer 38 for a 16-bit stage is identical, and each summer 39 for a 16-bit stage is identical.

The bit labelled 10px is $A_i$ $\overline{XOR}$ $B_i$, where $A_i$ and $B_i$ are the bits at bit position i in the two numbers to be added on buses 32 and 34. Accordingly, 10px will be 0 if either A or B are 1, and 1 if A and B are both 0 or both 1. Each summer 38, 39 inverts or does not invert this value of 10px for the summer's sum output terminal 40 and sum plus 1 output terminal 41, depending on the values of the other bits applied to that summer 38, 39.

For summer 38 the following relationships apply:

sum=$\overline{10px}$ if
   (cx AND px) OR (15c0 AND p)
sum=10px if
   (c AND px) OR (15c1 AND p)
sum+1=$\overline{10px}$ if
   (cx AND px) OR (15c1 AND p)
sum+1=10px if
   (c AND px) OR (15c0 and p)

Logical relationships between the input bits and the sum and "sum plus 1" output bits for summer 39 are easily understood by reference to FIG. 5A. Summer 39 differs from summer 38 by taking into account any sum plus 1 carry bit from the previous stage. Accordingly, each summer 38, 39 for a particular bit position receives all necessary signals for determining whether the sum for that bit position will be a 1 or 0 bit and whether the sum plus 1 for that bit position will be a 1 or a 0 bit.

The sum output terminal 40 of each summer 38, 39 is connected to an associated bit position in a sum output bus 42, having the same number of conductors as the input buses 32 and 34, and the sum plus 1 output terminal 41 of each summer 38, 39 is connected to an associated bit position in a sum plus 1 output bus 44.

After a single adding operation performed by adder 24, the sum of the numbers A and B on buses 32 and 34 is provided on bus 42, and the sum plus 1 of the numbers A and B is provided on bus 44. Either or both of the values on buses 42 and 44 may then be used for further processing of the data. In one particular application, the sum plus 1 value is used for rounding the sum in a multimedia application, as would be understood by those skilled in the art.

Although each of the two modules 30 and 31 is labelled 16-bits, in an actual embodiment shown in subsequent figures, the adder 24 is a 36-bit wide adder, and the first 16-bit module 30 processes those bit positions 17:0 on buses 32 and 34, the second 16-bit module 31 handles bits 34:18, and a separate logic section 45 (FIG. 6A) handles the bits at bit position 35. However, the flexibility of the adder 24 to handle 36 bits is not a necessary part of this invention, and the particular circuitry in the actual embodiment, shown in detail in FIGS. 4–15, uses circuit techniques for reducing silicon area, improving speed, providing flexibility in handling different word sizes, and other purposes which are optional for this invention. The logic blocks labelled 45 and 46 in FIG. 2 perform specialized tasks relating to changing the operation of adder 24 for different word sizes and for handling certain bit positions to accommodate word sizes which are not powers of 2, such as a 36 bit word. These logic blocks 45 and 46 are shown in detail in FIGS. 6, 10, and 11.

Figure 3:
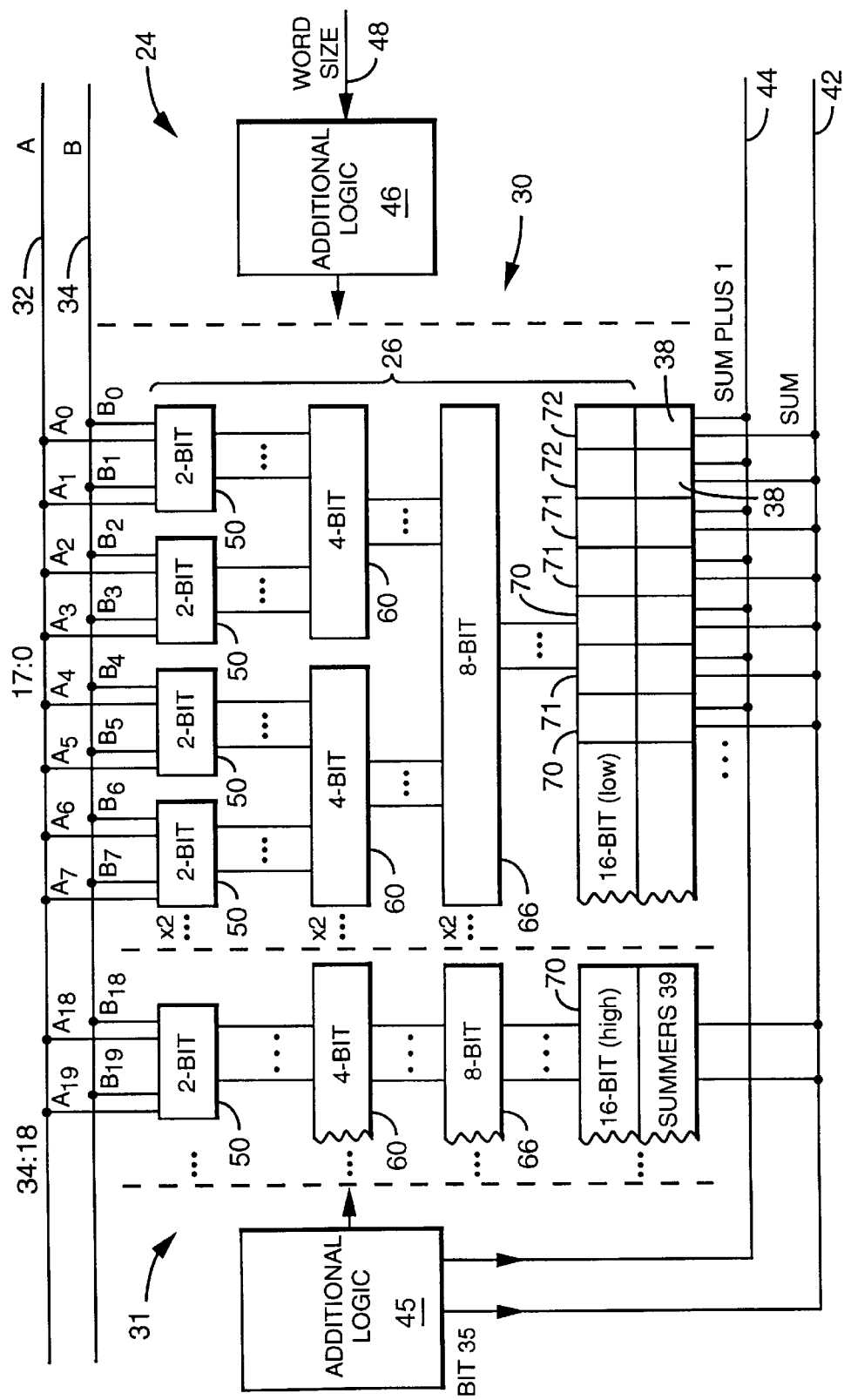
FIG. 3 is a more detailed block diagram of the preferred embodiment CLA adder.

FIG. 3 illustrates the preferred adder 24 in greater detail. Elements throughout the figures which are identified with the same numerals may be identical, and their description will not be redundantly provided. In the preferred embodiment adder 24, input buses 32 and 34 are 36 bits wide, and adder 24 can add numbers A and B of either 8, 9, 16, 32, or 36 bits wide. Adder 24 is divided into two 16-bit modules 30 and 31, and the additional four bits (for a 36-bit word size) are handled by extra logic 45, 46, internal to and external to the modules 30 and 31. In FIG. 3, the 16-bit modules 30 and 31 are only partially illustrated for simplicity, since their structure is repeated.

Signals on lines 48 indicate whether the word size is 8, 9, 16, 32, or 36 bits wide and are logically combined with bits in the 16-bit modules 30 and 31 so that the CLA tree portion 26 performs logical operations based upon the correct word size on buses 32 and 34.

A block and logic level diagram of an actual embodiment of a 36 bit adder 24 is shown in FIGS. 6A and 6B.

Figure 7:
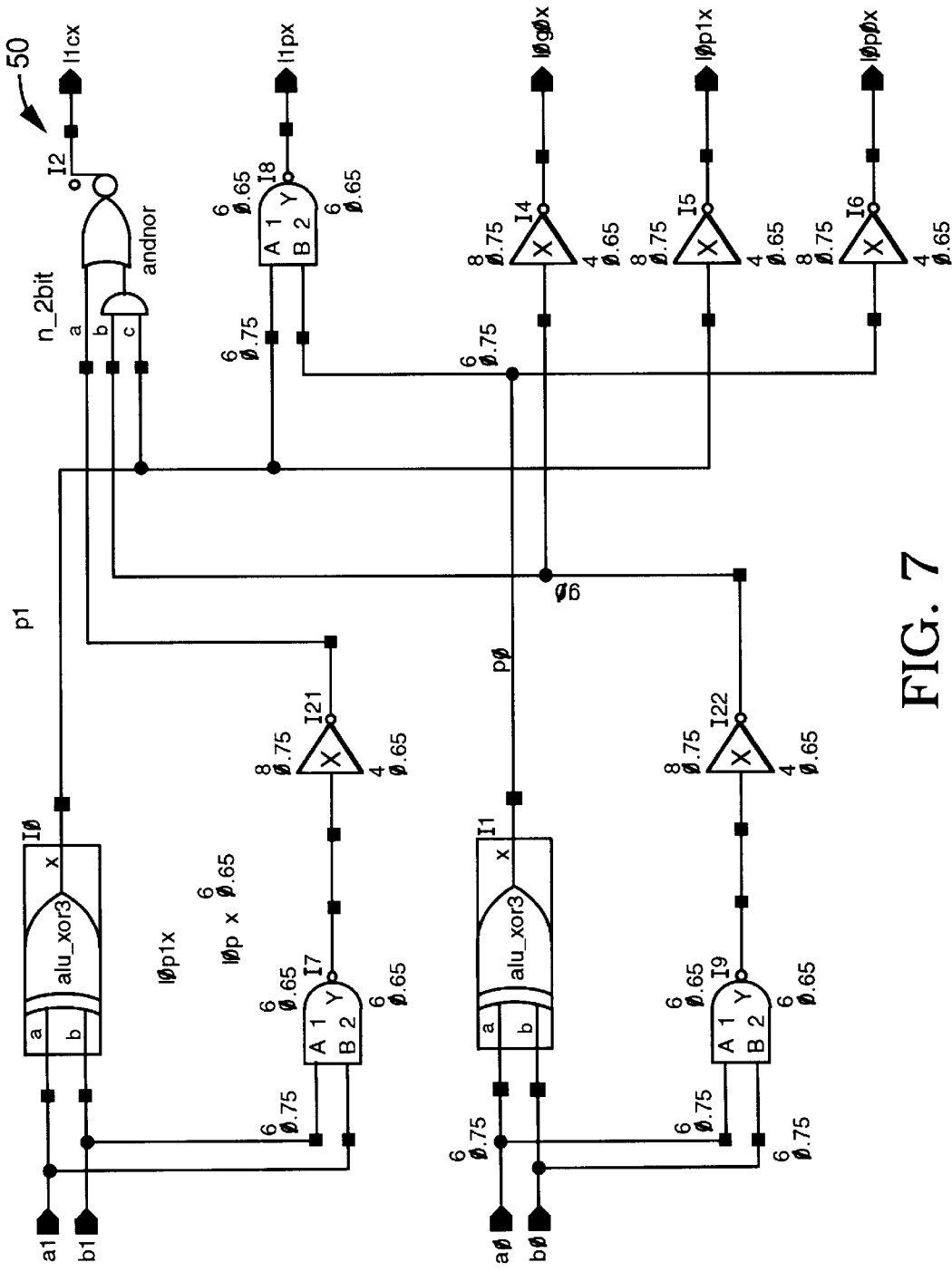

Referring back to FIG. 3, the 16-bit module 30 is composed of eight 2-bit logic blocks 50, each connected to two bit positions on buses 32 and 34. Detail of the 2-bit logic blocks 50 is shown in FIG. 7. Each 2-bit logic block 50 generates five signals. Assuming the bit positions are 0 and 1, the five signals are:

10p0x=$A_o$ $\overline{XOR}$ $B_o$
10p1x=$A_l$ $\overline{XOR}$ $B_l$
10g0x=$A_o$ $\overline{AND}$ $B_o$
11px=($A_o$ XOR $B_o$) $\overline{AND}$ ($A_l$ XOR $B_l$)
11cx=[($A_l$ XOR $B_l$) ($A_o$ AND $B_o$)] NOR ($A_l$ AND $B_l$).

Thus, the signal output from each 2-bit logic block 50 conveys relationships between the bits $A_i$ and $B_i$ in each bit position, as well as relationships between all four bits, in order to generate sum and carry bits related to these two bit positions.

Figure 8:
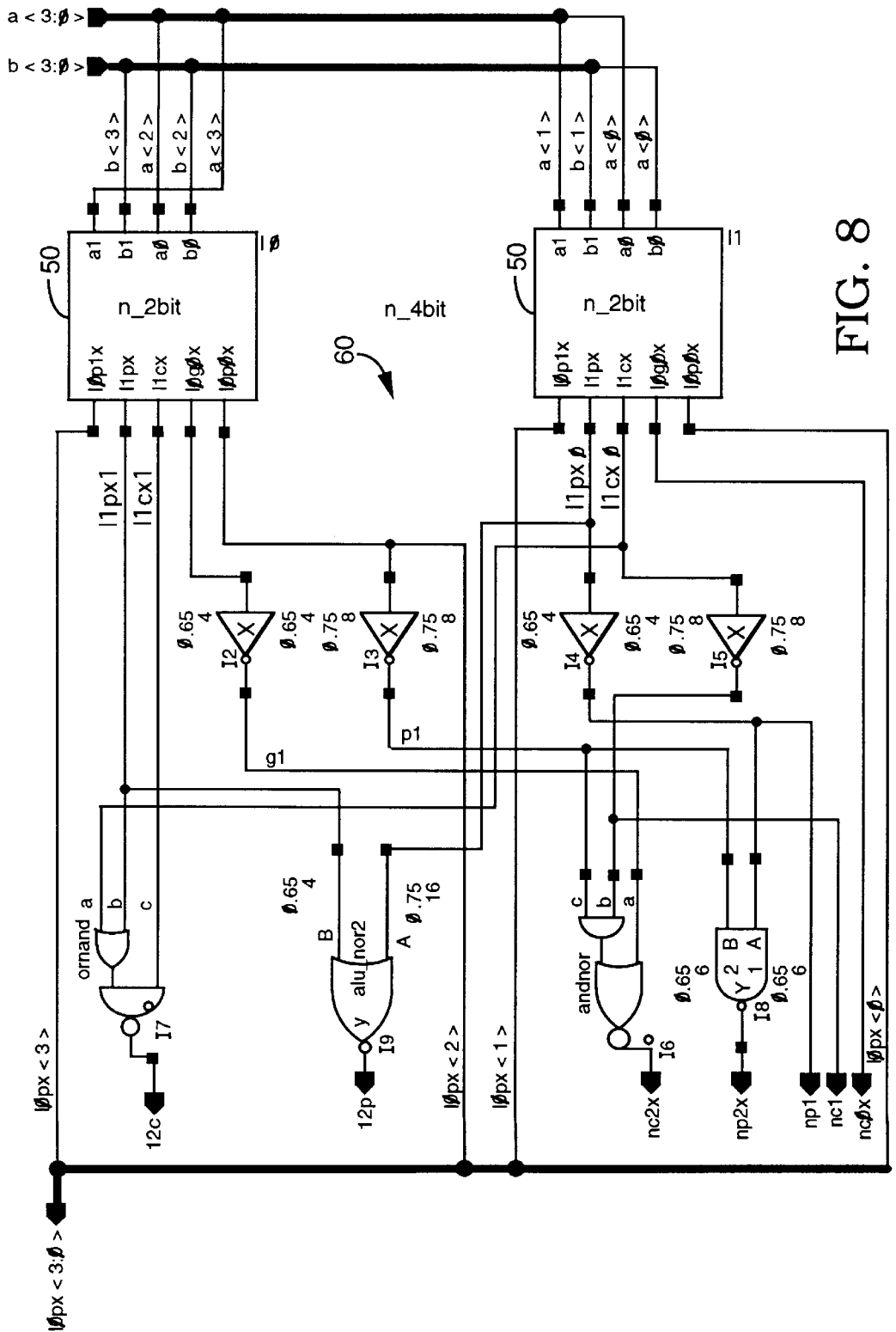

There are four 4-bit logic blocks 60, each connected to two 2-bit logic blocks 50, for performing logical operations on the outputs of the two 2-bit logic blocks 50, where the output of each 4-bit logic block 60 provides information regarding the carries and possible carries for these four bit positions. Detail of these 4-bit logic blocks 60 is shown in FIG. 8. The logical relationships between the inputs and outputs of the multi-bit logic blocks in FIG. 3 are easily understood by reviewing the figures, and describing the logical relationships in words is unnecessary.

Figure 9:
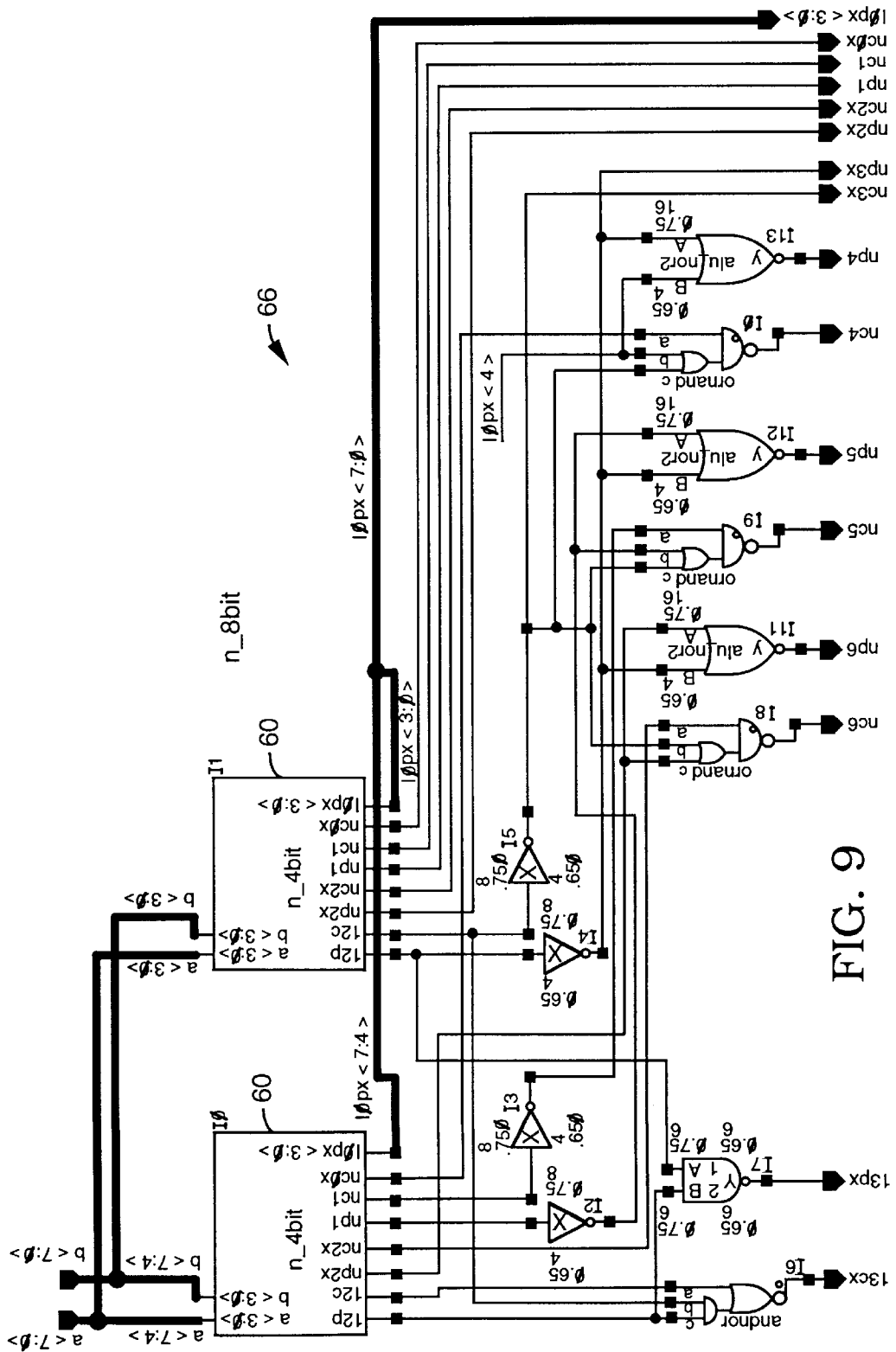

Two 8-bit logic blocks 66 are connected to two 4-bit logic blocks 60 and provide logical relationships between the bits in eight bit positions on buses 32 and 34 to identify carries and possible carries associated with these bit positions. Detail of these 8-bit logic blocks 66 is shown in FIG. 9.

Figure 10A:
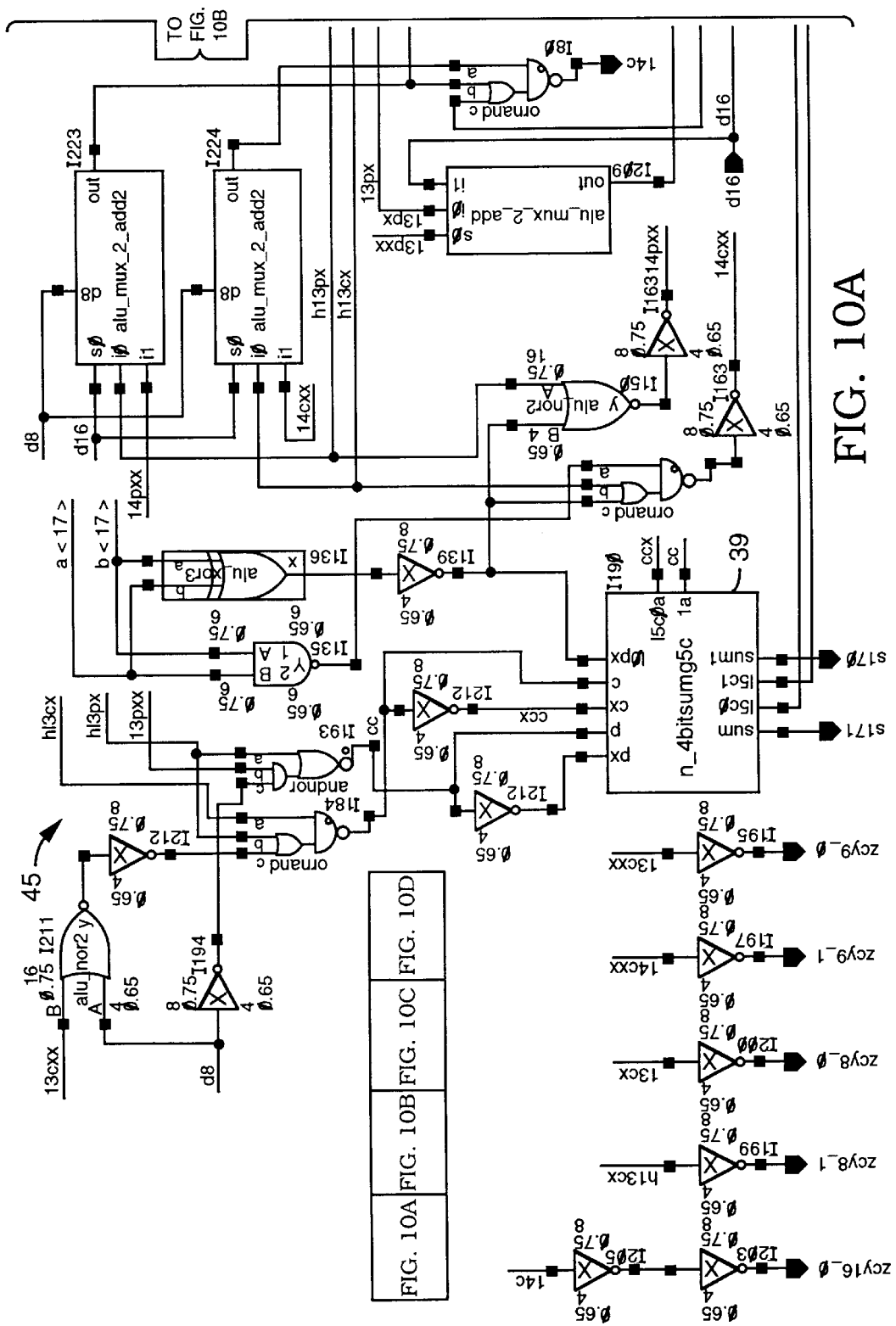
FIGS. 10A, 10B, and 10C constitute a diagram of a 16-bit logic block for the lower significant bits in the 36-bit adder.
Figure 10B:
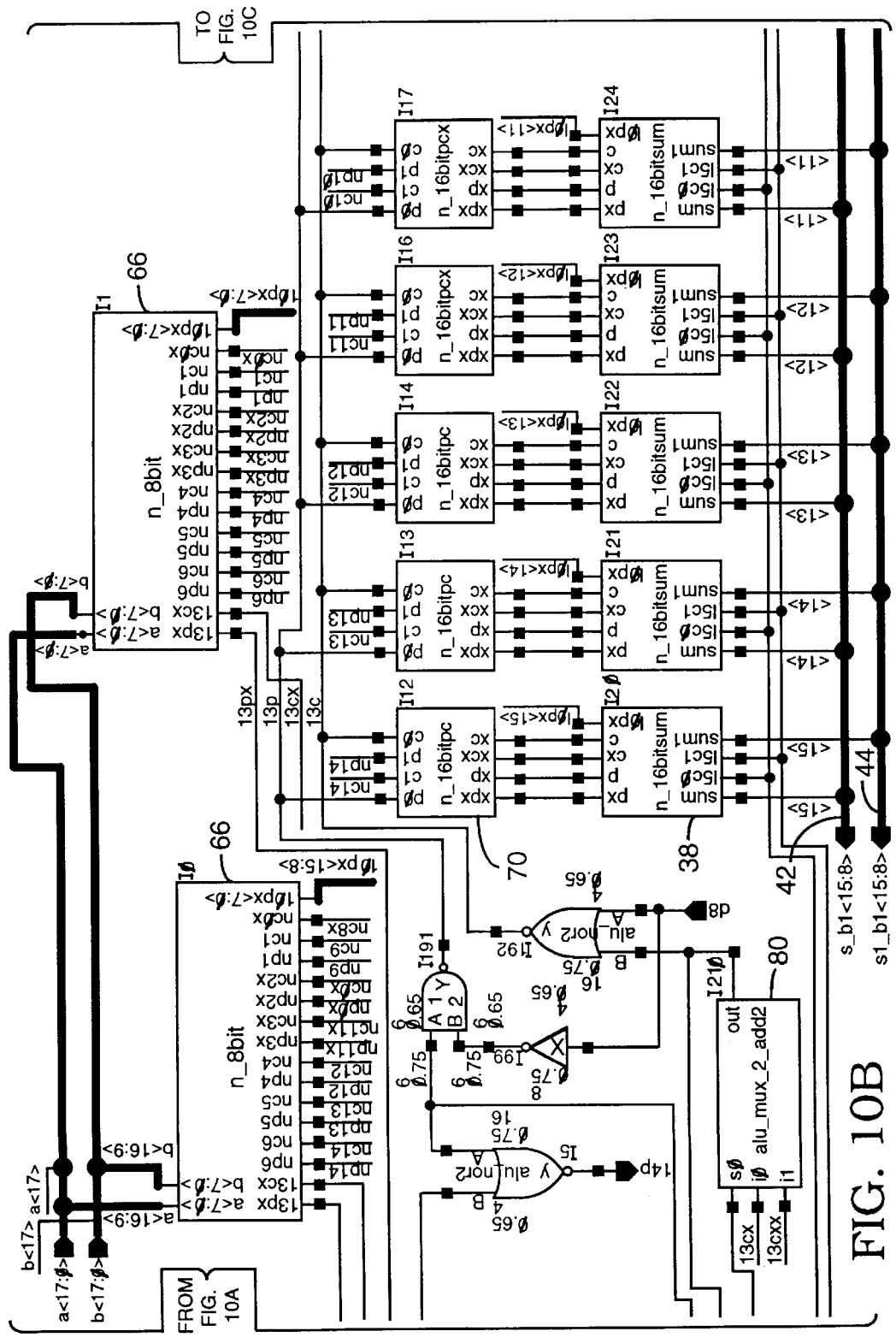
Figure 10C:
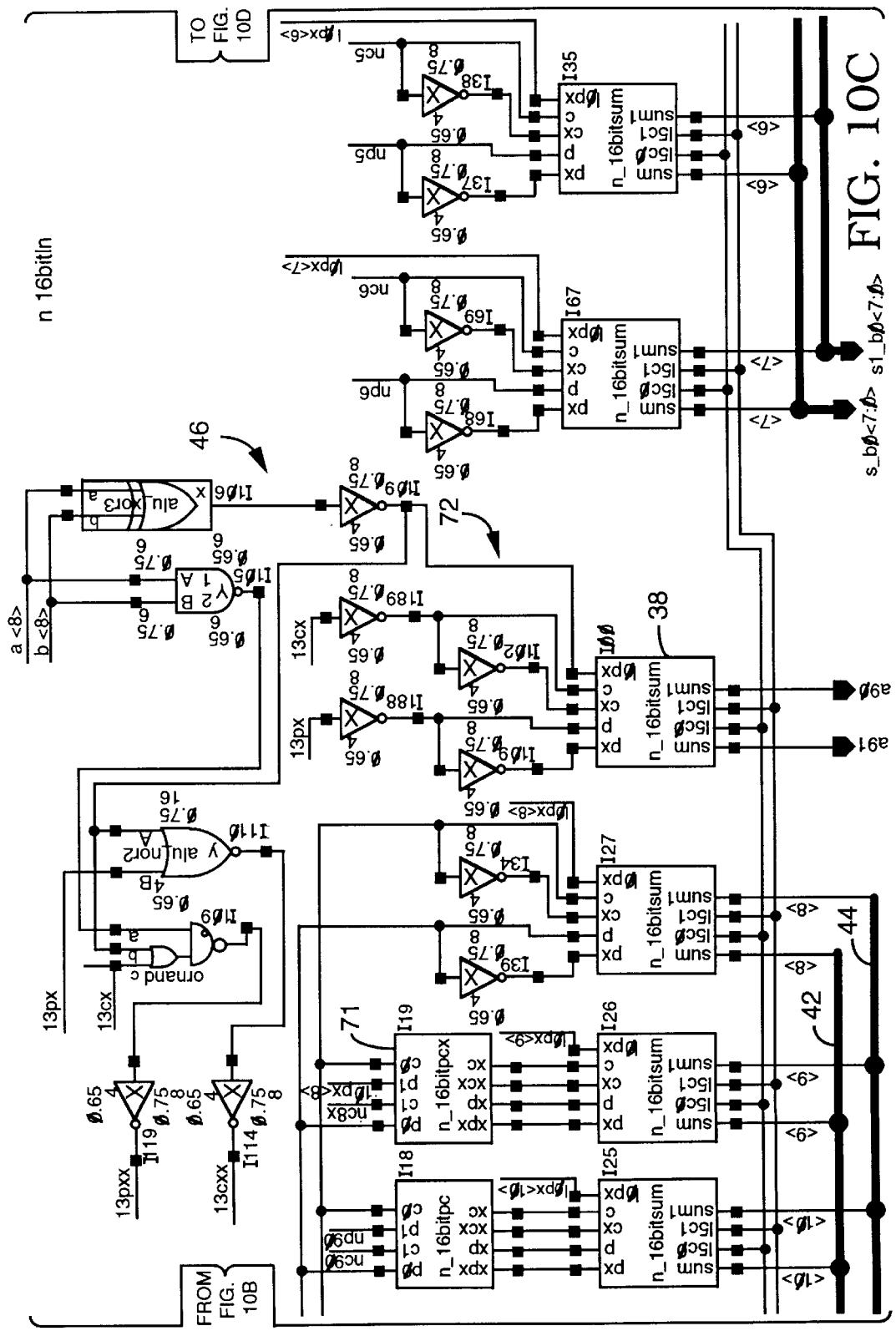
Figure 10D:
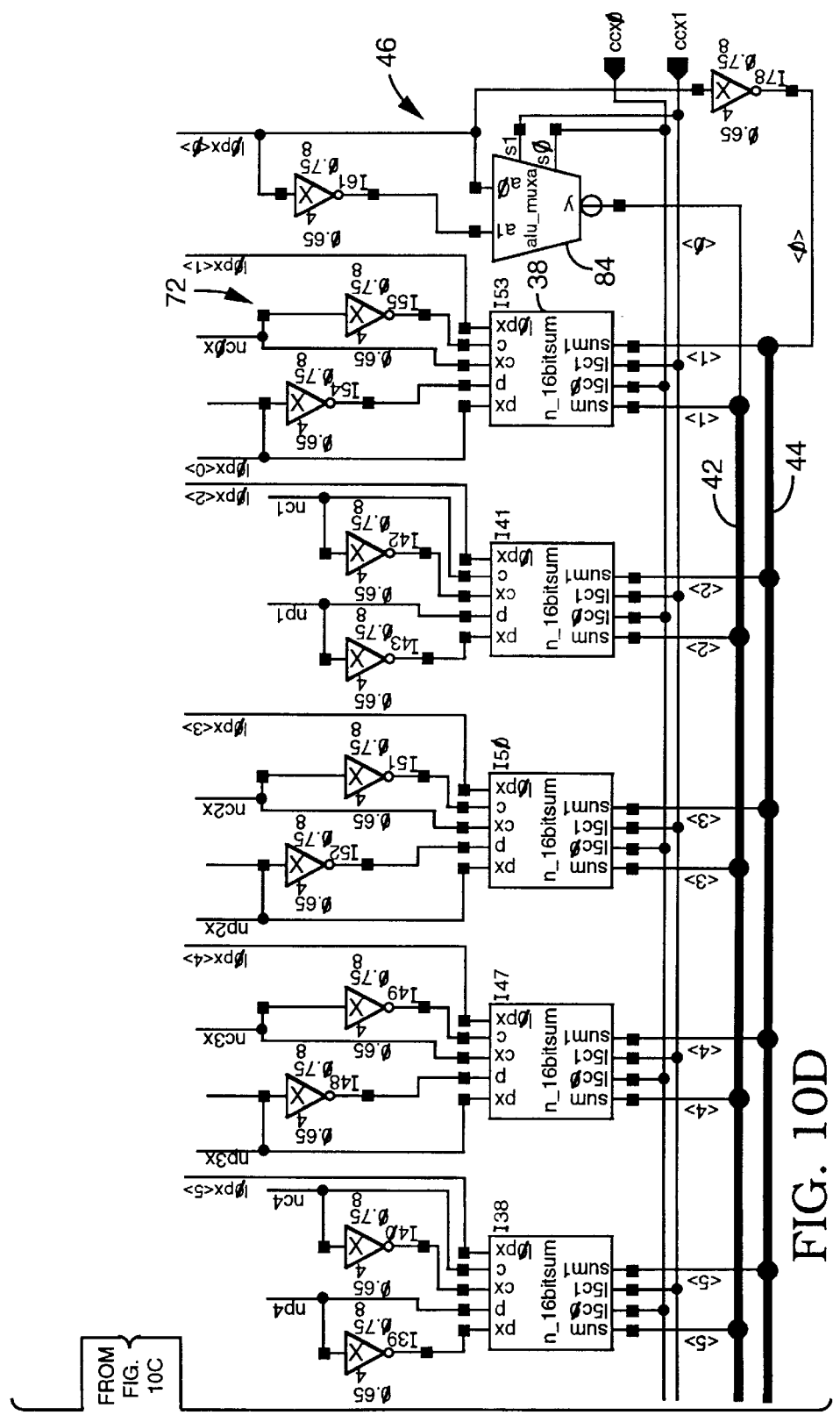
Figure 11A:
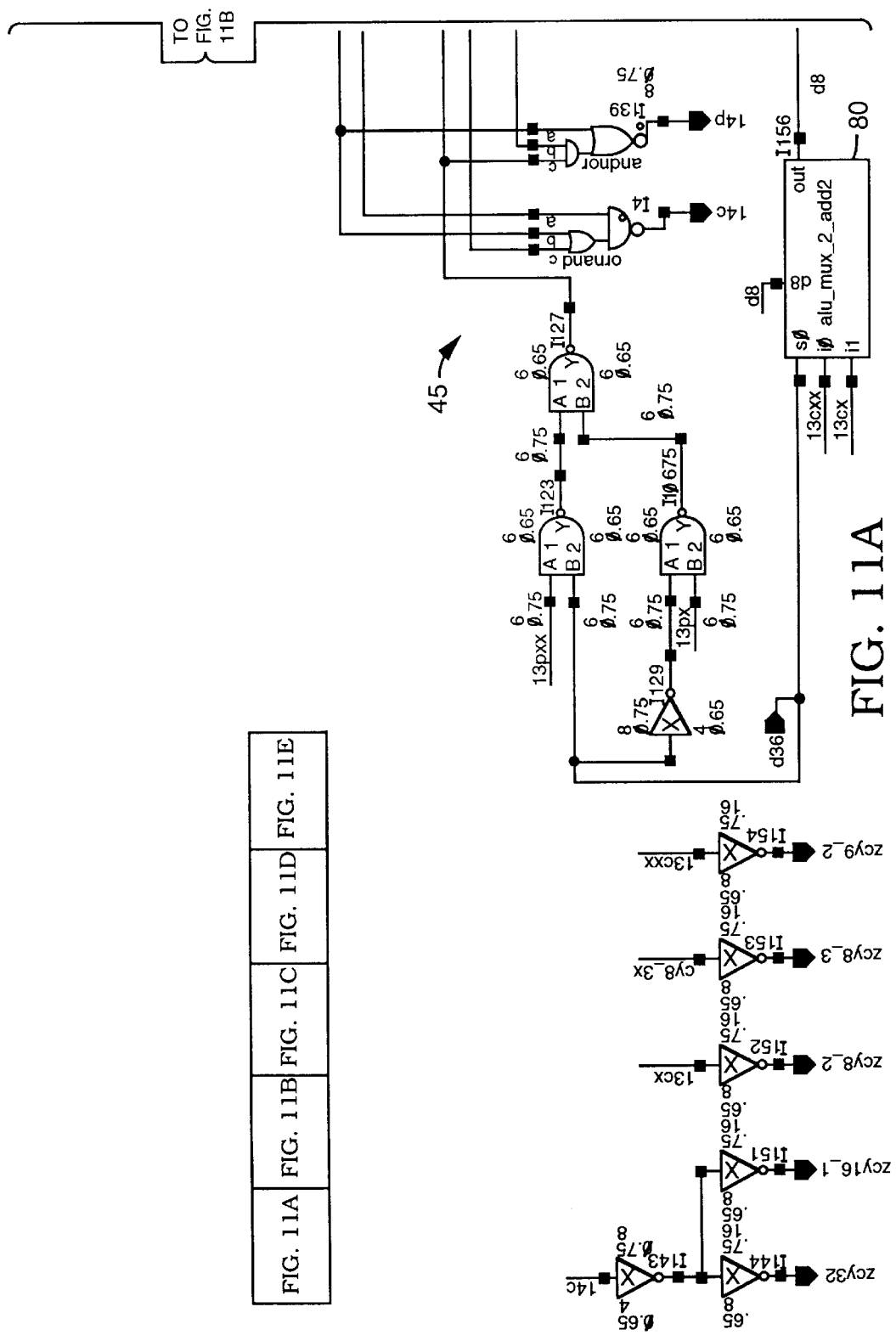
FIGS. 11A, 11B, and 11C constitute a diagram of a 16-bit logic block for the most significant bits in the 36-bit adder.
Figure 11B:
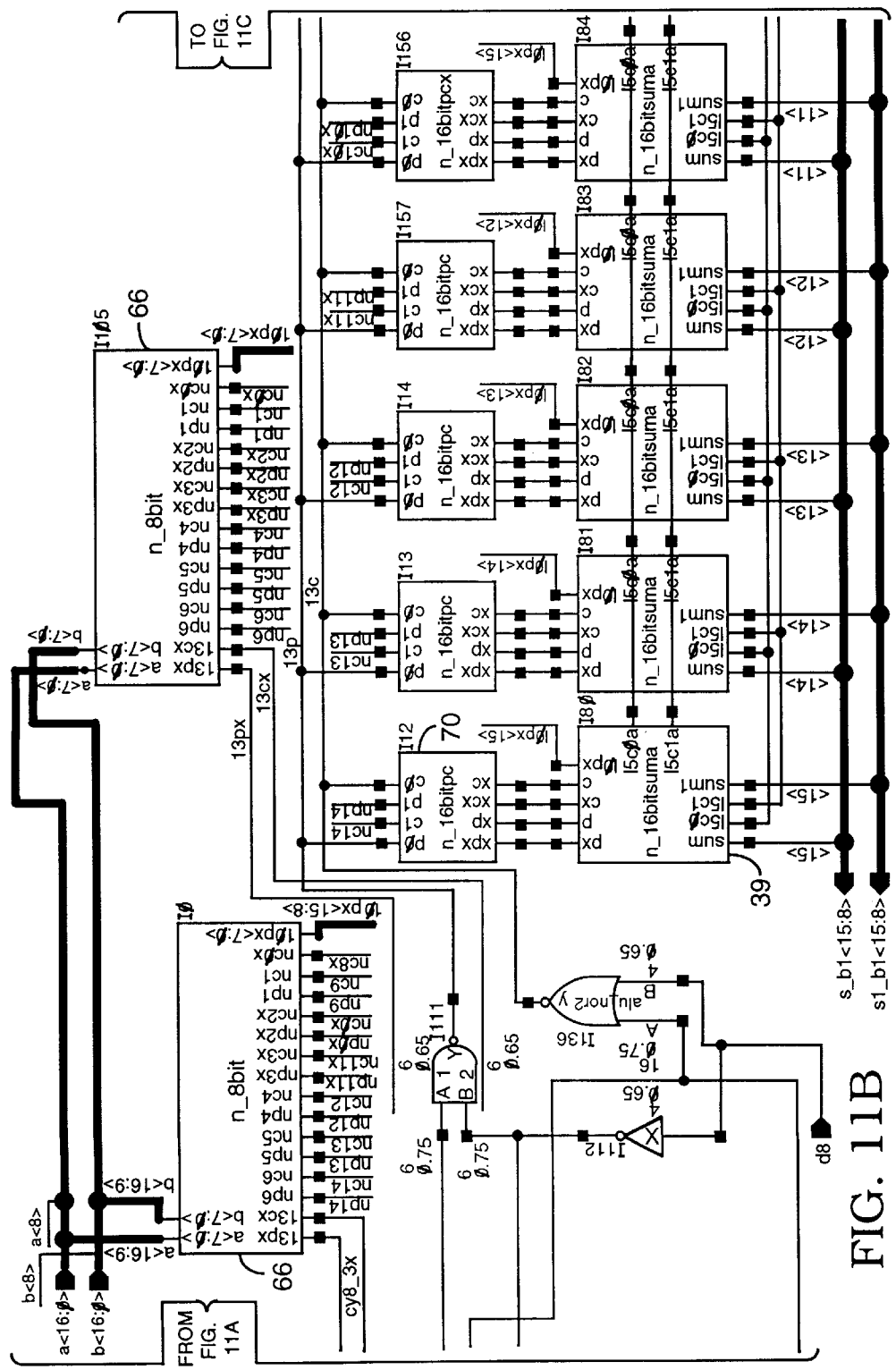
Figure 11C:
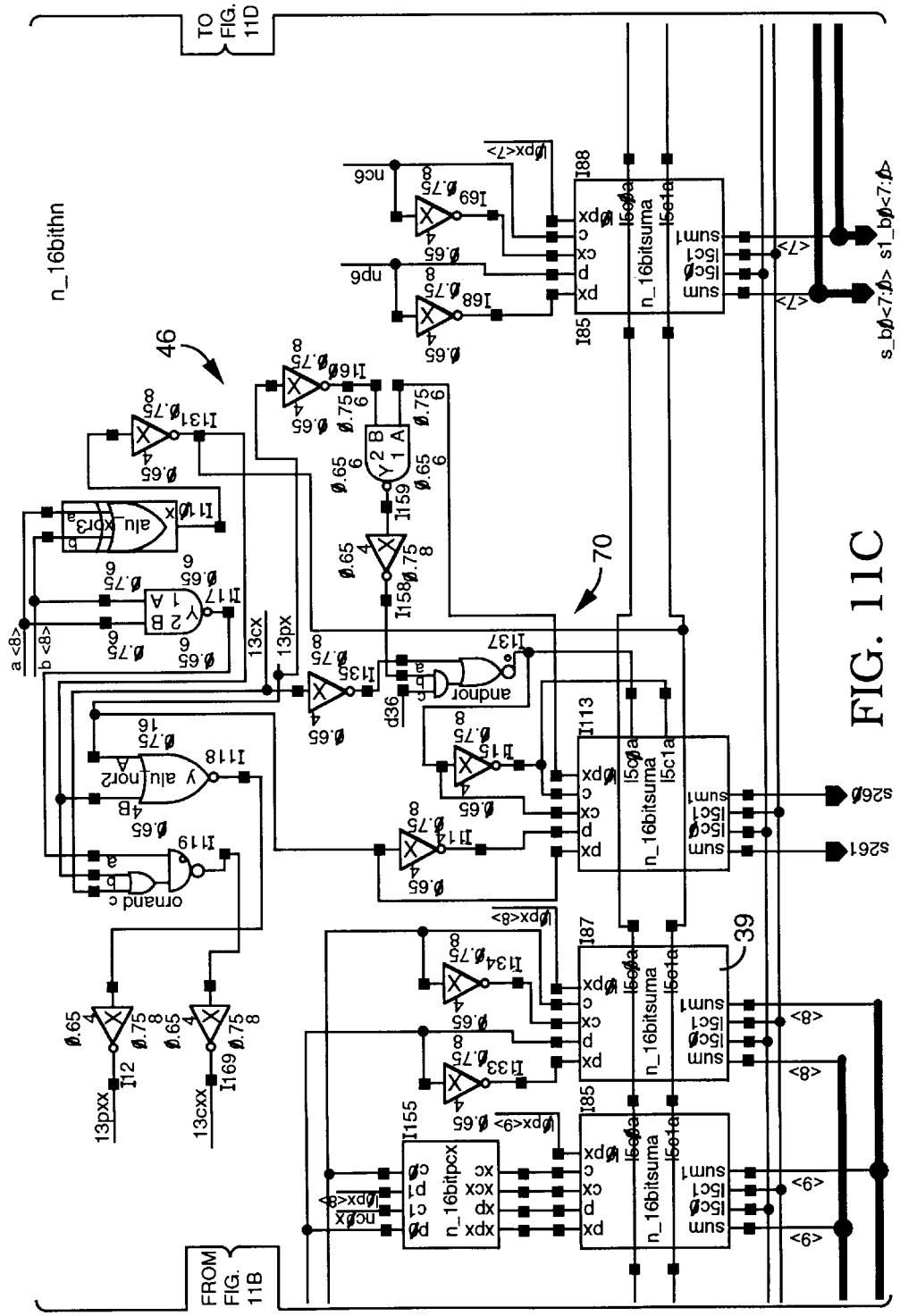
Figure 11D:
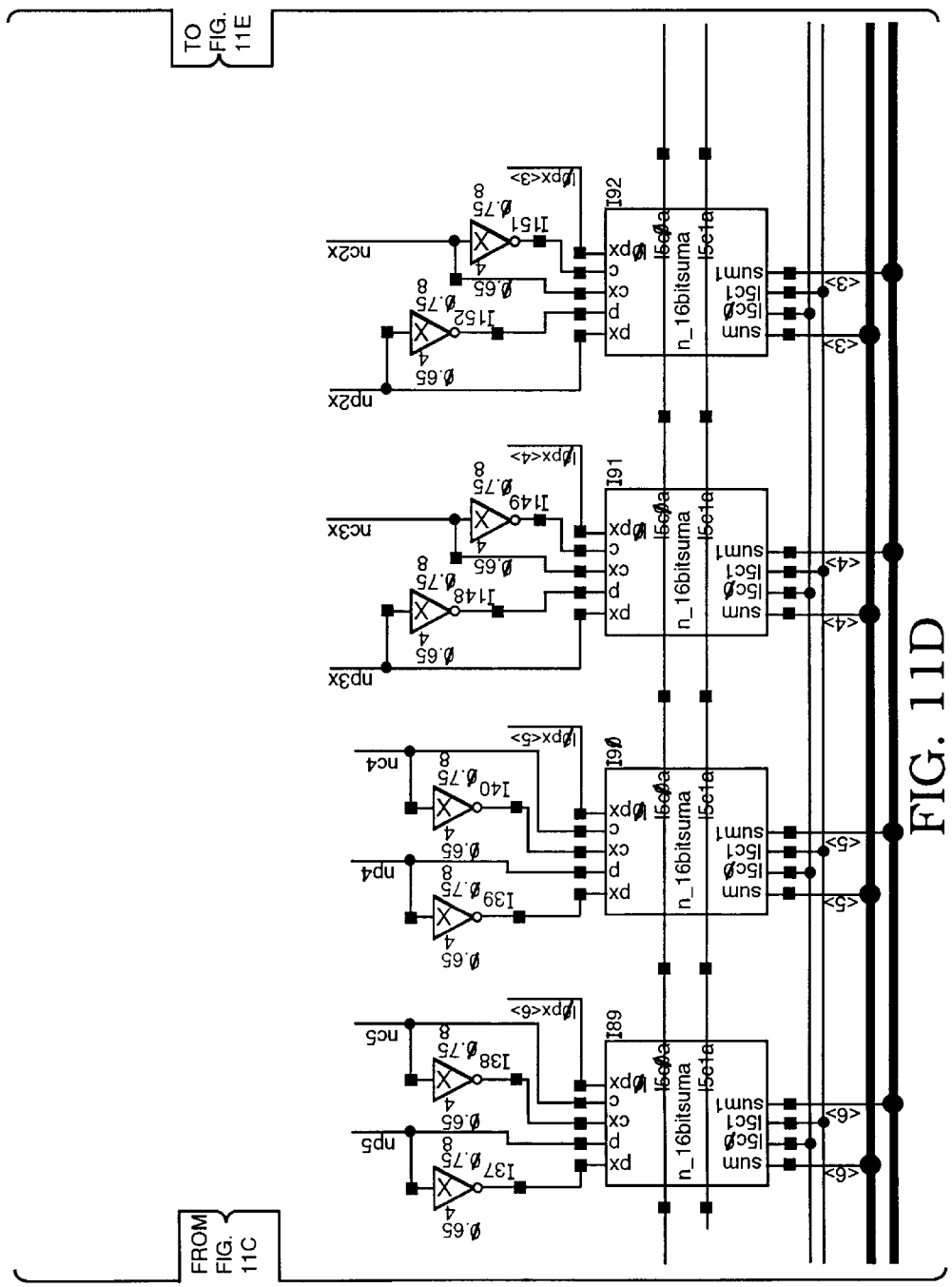
Figure 11E:
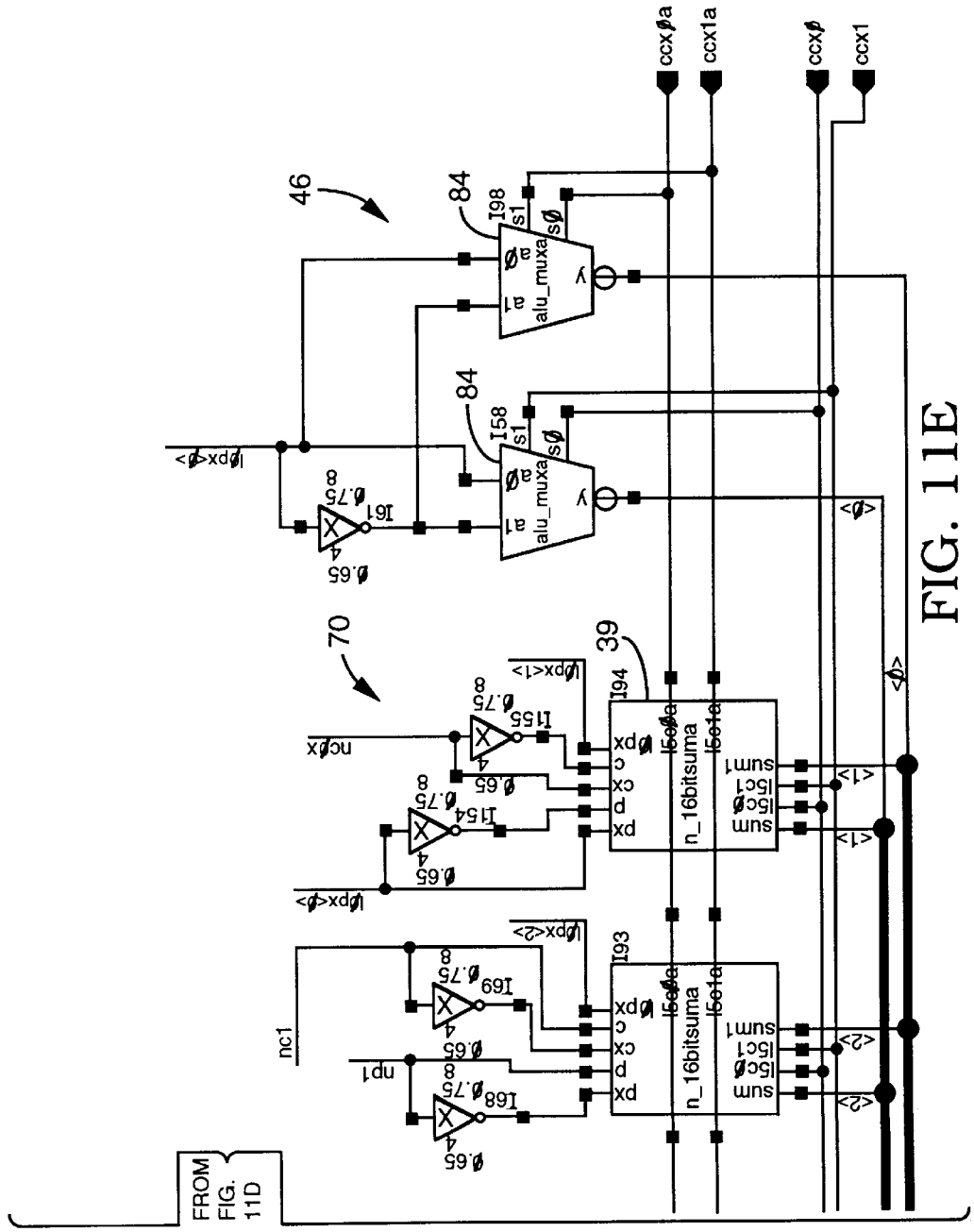
Figure 12:
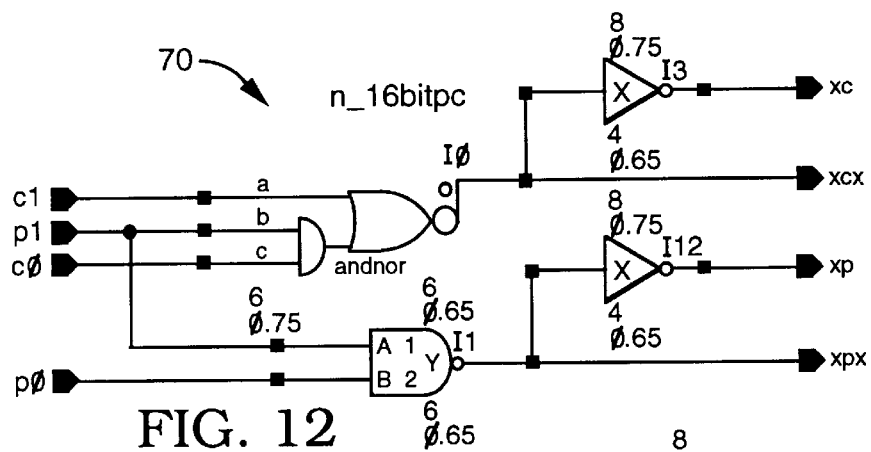
Figure 13:
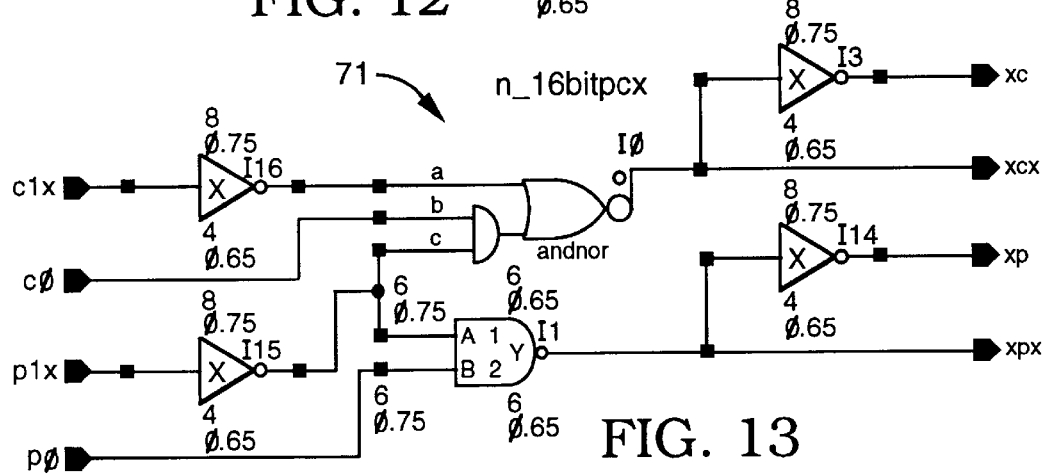

Sixteen 1-bit logic blocks 70, 71, 72 perform additional operations on the outputs of two 8-bit logic blocks 66 to create logic signals for application to the sixteen summers 38, each associated with a 1-bit logic block 70, 71, or 72. Detail of the 16-bit stage for bit positions 17:0 containing logic blocks 70, 71, 72 and summers 38 is shown in FIGS. 10A, 10B, and 10C, and detail of the 16-bit stage for bit positions 35:18 containing logic blocks 70, 71, 72 and summers 39 is shown in FIGS. 11A, 11B, and 11C. Detail of the 1-bit logic blocks 70, 71 is shown in FIGS. 12 and 13, respectively.

Figure 14:
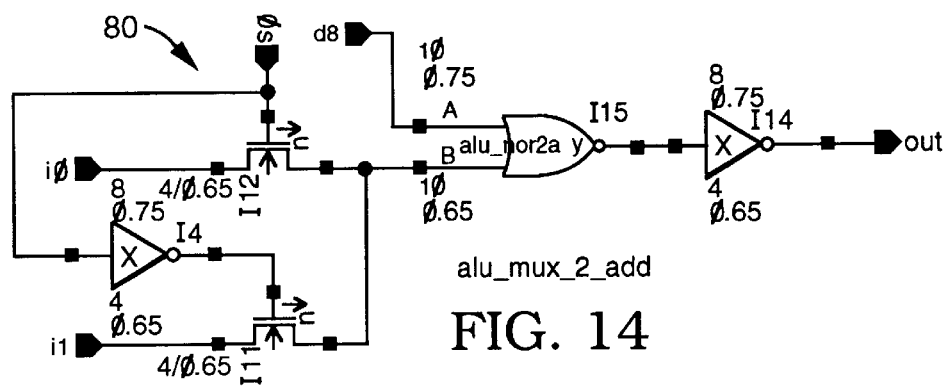
Figure 15:
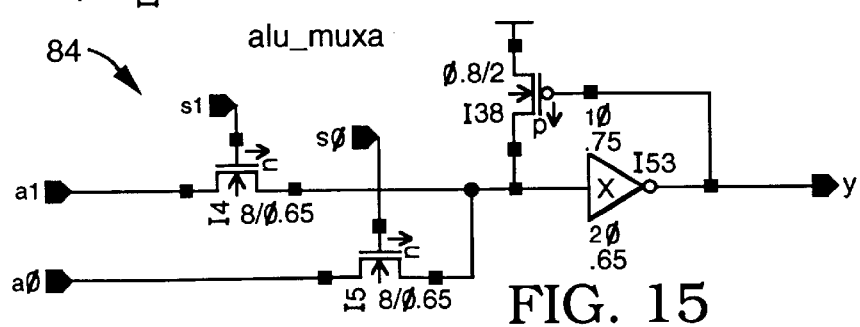

Additional logic used in the embodiment of FIGS. 6A and 6B is illustrated in FIGS. 14 and 15. FIG. 14 shows detail of a multiplexer 80 which receives control and data inputs, and FIG. 15 shows detail of a multiplexer 84 which receives control and data inputs.

Adder 24 in FIGS. 6A–15 may be simplified if the word size were fixed and were a power of two. Adder 24 may also be simplified if certain circuit techniques were not used to reduce silicon area and increase speed. The resulting adder would then require little or no logic outside of the modular logic blocks.

Many other equivalent logic circuits may be used for the summers and logic blocks described herein to obtain the same results. One skilled in the art would understand these equivalent circuits. For example, instead of the bit 10px (i.e., $A_i \overline{\text{XOR}} B_i$) for each bit position being generated by the carry tree portion 26 for application to a summer 38, 39, each summer 38, 39 may, instead, directly receive the actual bits $A_i$ and $B_i$ for that bit position and perform the exclusive OR operation. Also, all bits described herein may be inverted while obtaining the same results with little modification to the logic.

Modifications to existing CLA adder trees may be made to cause these trees to generate carry-related signals for the sum and sum plus 1 values while still practicing the teachings of this invention. Examples of such existing CLA adder trees are found in the book *Computer Architecture: A Quantitative Approach*, Appendix A, by David A. Patterson and John L. Hennessy, ISBN 1-55860-069-8, incorporated herein by reference. Other examples of CLA adder trees are described in the book *Integrated Circuitry in Digital Design*, pages 236–248, by Arpad Barna et al., ISBN 0-471-05050-4, 1973, and in U.S. Pat. Nos. 5,283,755; 5,278,783; and 5,276,635, all incorporated herein by reference.

Figure 1:
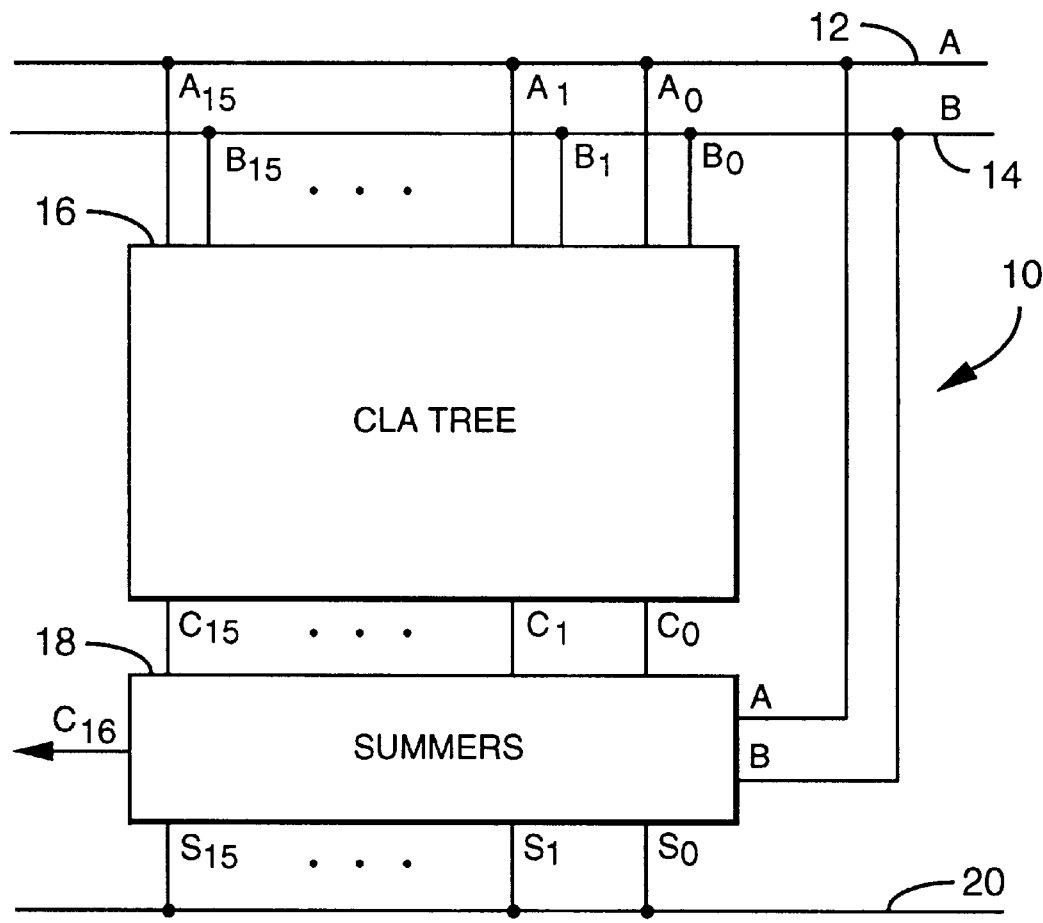
FIG. 1 illustrates a conventional CLA adder.

As shown, there is a distinct difference between a summer 38 or 39 of the present invention and a summer in the summer portion 18 of the conventional CLA adder 10 of FIG. 1 in that the summer 38, 39 of the present invention receives from the CLA tree portion 26 an indication of the bits $A_i$ and $B_i$ to be added by the summer (or a logical relationship such as $A_i \overline{\text{XOR}} B_i$ between those bits), as well as bits indicating a carry from a previous bit position for both the sum and the sum plus 1 output.

In the preferred embodiment, adder 24 is formed in a monolithic integrated circuit along with other circuitry for a multimedia processor. The processor may process 8, 9, 16, 32, or 36 bit words using the adder 24 disclosed herein.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An adder operable to receive first and second binary numbers and a carry signal indicative of a carry from a previous arithmetic operation, and operable to generate in parallel first and second sums derived from the first and second binary numbers and the carry signal, the first and second sums each having a plurality of bits, the first sum representing a sum of the first and second binary numbers and the carry signal, the second sum representing a sum of the first and second binary numbers and the carry signal plus one, the adder comprising:

a carry look-ahead tree operable to receive the first and second binary numbers, and operable to generate a plurality of values derived from the first and second binary numbers;

a summing circuit having a plurality of carry look-ahead tree input terminals operable to receive from the carry look-ahead tree a plurality of the values derived from the first and second binary numbers, the summing circuit further having at least one carry input terminal operable to receive the carry signal, the summing circuit being operable to generate at least one of the bits of the first sum in response to the plurality of bits received at the carry look-ahead tree input terminals and the carry signal, the summing circuit being operable to generate, in parallel with the at least one bit of the first sum, at least one of the bits of the second sum in response to the plurality of bits received at the carry look-ahead tree input terminals and the carry signal.

2. The adder of claim 1, wherein the plurality of values derived from the first and second binary numbers comprises a bit indicating an exclusive OR of one of the bits of the first binary number and a corresponding one of the bits of the second binary number.

3. The adder of claim 1 further comprising:

a first input bus conveying the first binary number, the first input bus being connected to at least one input terminal of the carry look-ahead tree;

a second input bus conveying the second binary number, the second input bus being connected to at least one input terminal of the carry look-ahead tree;

a first sum output bus connected to at least one output terminal of the summing circuit, the first sum output bus carrying the first sum; and a second sum output bus connected to at least one output terminal of the summing circuit, the second sum output bus carrying the second sum.

4. The adder of claim 3 further comprising a logic circuit operable to receive an indication of a word size on the first input bus and the second input bus, and operable to control the carry look-ahead tree to provide the values derived from the first and second binary numbers to selected ones of the summing circuits depending on the word size on the first and second input buses.

5. The adder of claim 1 further comprising a plurality of the summing circuits, each summing circuit being associated with one or more or the bits of the first sum and a corresponding one or more of the bits of the second sum.

\* \* \* \* \*